(12) United States Patent
Frese et al.

(10) Patent No.: US 6,471,103 B1
(45) Date of Patent: Oct. 29, 2002

(54) CARRYING AND/OR STORING DEVICE

(76) Inventors: Daryl Frese, 7921 Pronghorn, Spring Branch, TX (US) 78070; Patricia Frese, 7921 Pronghorn, Spring Branch, TX (US) 78070

( * ) Notice: Subject to any disclaimer, the term of this patent is extended or adjusted under 35 U.S.C. 154(b) by 0 days.

(21) Appl. No.: 09/662,436

(22) Filed: Sep. 15, 2000

Related U.S. Application Data

(60) Provisional application No. 60/154,189, filed on Sep. 15, 1999.

(51) Int. Cl.[7] ............................................. A01K 97/10
(52) U.S. Cl. .................. 224/200; 206/315.11; 206/249; 206/251; 206/922
(58) Field of Search ................................. 224/200, 247, 224/249, 251, 917, 922, 281, 242, 916; 43/26; 206/315.3, 315.5, 315.11

(56) References Cited

U.S. PATENT DOCUMENTS

| | | | | |
|---|---|---|---|---|
| 2,854,147 A | * | 9/1958 | Derr | 211/70.8 |
| 2,908,432 A | * | 10/1959 | Kent | 124/25.7 |
| 3,337,099 A | * | 8/1967 | Rose | 224/242 |
| 3,465,928 A | * | 9/1969 | Osterholm | 124/25.7 |
| 3,966,051 A | * | 6/1976 | Hollister et al. | 206/315.3 X |
| 4,073,328 A | * | 2/1978 | Franklin | 124/25.7 |
| 4,311,262 A | * | 1/1982 | Morin | 224/922 X |
| 4,628,628 A | * | 12/1986 | Burgin et al. | 224/251 |
| 4,753,446 A | * | 6/1988 | Mills | 206/315.3 X |
| 5,071,048 A | * | 12/1991 | Price et al. | 224/247 |
| 5,072,539 A | * | 12/1991 | Greenberg | 43/26 |
| 5,137,319 A | * | 8/1992 | Sauder | 224/922 X |
| 5,450,688 A | * | 9/1995 | Hall | 43/26 |
| 6,047,491 A | * | 4/2000 | De Busk | 206/315.11 |

* cited by examiner

Primary Examiner—Stephen K. Cronin
Assistant Examiner—Maerena W. Brevard
(74) Attorney, Agent, or Firm—Weiner & Burt, P.C.; Irving M. Weiner; Pamela S. Burt

(57) ABSTRACT

A device to carry and store several fully-rigged fishing poles and reels without tangling. A base is connected to an upper platform by a connecting rod. The base and upper platform have aligned means for securing the fishing poles in place. An adjustable strap allows for hands free transportation.

2 Claims, 1 Drawing Sheet

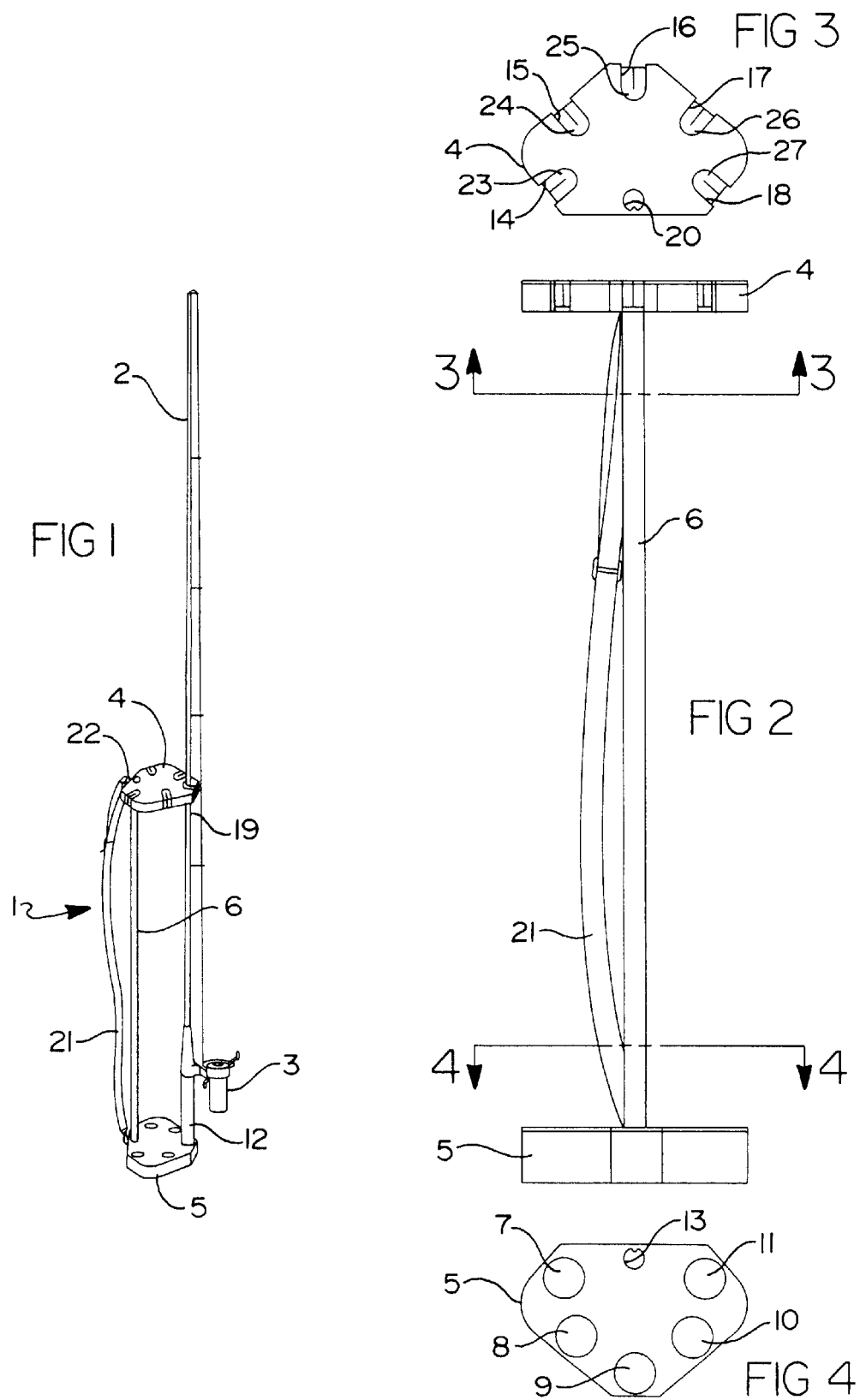

CARRYING AND/OR STORING DEVICE

This application is based on and claims priority from U.S. Provisional Patent Application 60/154,189 filed Sep. 15, 1999.

The present invention relates generally to certain new and useful improvements in carrying and/or storing devices. More particularly, the present invention relates to a novel device for carrying and/or storing a plurality of fully-rigged fishing rods without tangling thereof.

BACKGROUND OF THE INVENTION

The prior art is exemplified by the following patents.

U.S. Pat. No. 2,501,270 issued in 1950 to Fleming entitled "FISH AND GUN BOX" discloses a portable kit having a compartment for fishing rods and guns, or both rods and guns, and other compartments for other fishing and hunting equipment or accessories, such as reels, lines, flies, shells, etc. The kit is cylindrical, when closed, and may be stood on end. When opened, the respective parts will be on an even keel on a supporting surface such as the ground, a table, or the like.

U.S. Pat. No. 2,897,864 issued in 1959 to Schmidt entitled "QUIVER" discloses upper and lower arrow-support platforms projecting perpendicularly from a connecting member. The underside of the upper platform has a layer of sponge rubber or other resilient material. The top surface of the lower platform has a protective layer, such a hard rubber. The distance between the platforms is slightly less than the over-all length of the arrows.

U.S. Pat. No. 2,905,218 issued in 1959 to Smith et al entitled "ARROW QUIVER OR HOLDER" discloses a body portion having a retainer bar and a lower pocket. The retainer bar has a plurality of vertically disposed wedge shaped slots to hold the arrows. The lower pocket has a plurality of openings 16 with pads for the arrow points.

U.S. Pat. No. 3,399,009 issued in 1968 to Slade entitled "ROD CASE" discloses a carrying case for fishing rods formed from metal or plastic strips providing a frame and sheet-like panels anchored to the frame. In one embodiment, the case has two hinged together longitudinal sections, one or both of which may be provided with rod retaining fasteners. In a second embodiment, the case is in the form of an end opening sleeve which slidably receives a tray carrying the rods.

U.S. Pat. No. 3,674,190 issued in 1972 to Wright entitled "CARRIER FOR RODS WITH REELS ATTACHED" discloses a carrier for fishing rods with reels attached having an elongated member. Reel protectors extend transverse to and beyond at least two sides of the elongated member and adjacent one end of the elongated member to protect at least two rods held against the two sides. A removable cover covers the handles and reels. A flexible strap attached to the cover extends over the shoulder of the user.

U.S. Pat. No. 4,572,416 issued in 1986 to Upham entitled "ENCLOSING-TYPE FISHING POLE CARRIER" discloses a fishing pole carrier for holding and protecting fishing poles in their assembled conditions. The fishing pole carrier has a plurality of parallel spaced-apart tubular members having open-ended slots at their entry ends to slidably receive therein the posts for the reels of the respective fishing poles held in the tubular members.

U.S. Pat. No. 5,421,117 issued in 1995 to Geraci et al. entitled "CARRIER, TRANSPORT, AND STORAGE DEVICE" discloses a carrier, transport, and storage device for securing together, transporting, and storing the segments of a fully-rigged fishing pole after it has been temporarily broken down for transport or storage. A main body member coupling and a female coupling end of a clip device are made of a material conducive for gripping during a frictional engagement, and tapered and leveled to firmly telescopically grip and hold the pole segment ferrule portions. The pole segments are aligned so that the mounted line guides and fishing line face inwardly. The space is filled by suspending the clip device over a protruding support element of a storage rack.

U.S. Pat. No. 5,450,688 issued in 1995 to Hall entitled "DEVICES FOR SUPPORTING A PLURALITY OF FISHING RODS WITH REELS WHEN IN THEIR TWO-PIECE STATES" discloses a device for supporting and transporting a plurality of fishing rods when disassembled into two pieces. A support member has a handle formed of a generally horizontally disposed linear member having a grip in the central extent thereof with downwardly turned ends with outwardly extending support rods. The support member also has a carrying strap extending outwardly from the ends and over the grip and notches. A pair of support wheels each has a central recess for receiving a support rod for coupling therebetween. Each support wheel has a plurality of axially aligned recesses extending inwardly from the periphery. The recesses are formed in pairs of large and small recesses. The recesses of the wheels are in axial alignment to form complementary sets for receiving fishing rod halves, with the smaller outboard end of each rod half in the larger recesses. A pair of bases are each formed with a flat segment positionable on the ground and an upper segment coupled with respect to the lowermost extent of a support wheel, whereby the support wheels and bases may be received on the ground in a generally horizontal orientation.

U.S. Pat. No. 5,664,721 issued in 1997 to Homeyer entitled "BACKPACK-STYLE FIREARM/BOW/FISHING ROD CARRIER" discloses a backpack-style carrier for transporting sporting equipment, such as a rifle, a shotgun, an archery bow, or two fishing poles. The handle grip of the fishing rods may be placed in the device's lower pocket. The upper fishing rod portions are held in place by an upper strap which closes with a hook and loop fastening system, such as Velcro. Shoulder straps attached to the device allow the fishing rods to be carried backpack-style in a vertical position. An optional waist belt provides additional stability.

It is a desideratum of the present invention to avoid the animadversions of the above-described techniques, devices, and mechanisms for carrying and/or storing objects or items.

SUMMARY OF THE INVENTION

The present invention provides a new and useful device for carrying and/or storing a plurality of fishing rods without tangling. A shoulder strap allows hands-free transporting. The device preferably, but not necessarily, includes a foam-filled base with a connecting rod to an upper platform, allowing the storage and/or transporting of a plurality of fishing rods. The base, the connecting rod, and the top platform may preferably, but not necessarily, be manufactured from molded plastic. The base and the upper platform may preferably, but not necessarily, contain a PE type foam. The shoulder strap may preferably, but not necessarily, be fabricated from nylon with clips.

It is, therefore, one of the primary objects of the present invention to provide a novel device for carrying and/or storing fishing rods without tangling.

It is another object of the present invention to provide a novel device as described hereinabove which can preferably, but not necessarily, accommodate five fishing rods.

It is a further object of the present invention to provide a novel device as described hereinabove which includes at least one strap member for selective and adjustable securement of the device to the user thereof.

The present invention possesses many advantages and features which will become more apparent to those persons skilled in this area of technology and others when reading the detailed description of one exemplary preferred embodiment of the present invention as set forth hereinbelow in conjunction with the accompanying drawings.

BRIEF DESCRIPTION OF THE DRAWINGS

FIG. 1 is a perspective illustration of a preferred embodiment of the present invention, and depicting how the device holds and carries one fully-rigged fishing pole and reel.

FIG. 2 is an elevational view of the FIG. 1 device with the fishing pole and reel removed.

FIG. 3 is a view of the FIG. 2 device taken along the line 3—3.

FIG. 4 is a view of the FIG. 2 device taken along the line 4—4.

DETAILED DESCRIPTION OF ONE PREFERRED EMBODIMENT

In accordance with a preferred embodiment of the present invention, there is provided, as illustrated in FIG. 1, a novel device 1 for transporting and/or storing up to five fully-rigged fishing poles 2 with reels 3.

The device 1 includes an upper platform 4 and a bottom platform 5 interconnected with a connecting rod 6. Preferably, but not necessarily, the upper platform 4, the bottom platform 5, and the connecting rod 6 may be fabricated from molded plastic.

Furthermore, the upper platform 4 and the bottom platform 5 may preferably, but not necessarily, be filled with a PE type foam.

The bottom platform 5 may be provided with five cylindrical sockets 7, 8, 9, 10 and 11 (as best illustrated in FIGS. 1 and 4) for removably receiving the butts 12 of five fishing poles 2, respectively, and a predetermined aperture 13 to fixedly receive the connecting rod 6.

The upper platform 4 may be provided with five predetermined channels 14, 15, 16, 17 and 18 (as best illustrated in FIGS. 1, 2 and 3) for removably receiving the rod portions 19 of the five fishing poles 2, and a predetermined aperture 20 for affixation of the connecting rod 6.

The channels 14, 15, 16, 17 and 18 are aligned with the cylindrical butt-receiving sockets 7, 8, 9, 10 and 11. Each channel 14, 15, 16, 17 or 18 may preferably, but not necessarily, be provided with a rubberized insert member 23, 24, 25, 26 or 27, respectively, for retaining an associated fishing rod portion 19 in a fixed position in its associated channel.

The device 1 is provided with an adjustable strap 21 (as best illustrated in FIGS. 1 and 2) which preferably, but not necessarily, is fabricated from nylon. The strap 21 may be attached with a clip or clips 22. There may be a "D" ring affixed to both ends. The shoulder strap 21 allows for hands free transporting.

There has been illustrated in the accompanying drawings and described hereinabove only one unique and novel preferred embodiment of the present invention which can be constructed in several different sizes and shapes. It should be understood that many changes, modifications, variations, and other uses and applications will become apparent to those persons skilled in this particular area of technology and to others after having been exposed to the present specification and accompanying drawings.

For example, the device may used and/or adapted to carry and/or store other objects or items, such as, for example, rifles, archery or hunting bows, spears, arrows, golf or croquet clubs, etc.

Any and all such changes, modifications, variations, and other uses and applications which do not depart from the spirit and scope of the present invention are therefore covered by and embraced within the present invention and patent application and the appended claims.

What is claimed is:

1. A device for carrying and storing a plurality of fully-rigged fishing poles with reels without tangling thereof, comprising:

a bottom platform having a plurality of sockets therein;

an upper platform having a plurality of predetermined channels therein;

a connecting rod mechanically and rigidly connecting said platforms;

said bottom platform having said plurality of sockets disposed near the outer periphery of said bottom platform;

said upper platform having said plurality of predetermined channels disposed near the outer periphery of said upper platform;

said connecting rod mechanically and rigidly interconnects said bottom platform and said upper platform near said outer periphery of said platforms;

an adjustable shoulder strap connected to both said platforms; and said plurality of sockets and said plurality of predetermined channels being positioned, shaped and dimensioned to removably receive therein said fully rigged fishing poles with reels without tangling thereof for carrying and storage thereof.

2. A device according to claim 1, wherein:

each said channel is provided with a rubberized insert member.

\* \* \* \* \*